(12) United States Patent
Traa et al.

(10) Patent No.: US 12,475,906 B2
(45) Date of Patent: Nov. 18, 2025

(54) METHOD AND SYSTEM FOR MULTIPLE TIME RESOLUTION AUDIO PROCESSING

(71) Applicant: Analog Devices, Inc., Wilmington, MA (US)

(72) Inventors: Johannes Traa, Medford, MA (US); Atulya Yellepeddi, Medford, MA (US); Donald F. Porges, Watertown, MA (US)

(73) Assignee: Analog Devices, Inc., Wilmington, MA (US)

( * ) Notice: Subject to any disclaimer, the term of this patent is extended or adjusted under 35 U.S.C. 154(b) by 174 days.

(21) Appl. No.: 18/450,784

(22) Filed: Aug. 16, 2023

(65) Prior Publication Data
US 2025/0061911 A1     Feb. 20, 2025

(51) Int. Cl.
*G10L 21/0224*     (2013.01)
*G10L 21/0216*     (2013.01)

(52) U.S. Cl.
CPC ...... *G10L 21/0224* (2013.01); *G10L 21/0216* (2013.01); *G10L 2021/02166* (2013.01)

(58) Field of Classification Search
CPC ............ G10L 21/0224; G10L 21/0216; G10L 21/0208; G10L 21/0232
See application file for complete search history.

(56) References Cited

U.S. PATENT DOCUMENTS

| | | | | |
|---|---|---|---|---|
| 2012/0250455 | A1* | 10/2012 | Djikpesse | G01V 1/30 367/14 |
| 2013/0294614 | A1* | 11/2013 | Bharitkar | G10L 25/78 381/71.1 |
| 2019/0342660 | A1* | 11/2019 | Janse | H04R 3/005 |
| 2019/0349678 | A1* | 11/2019 | Janse | H04R 3/005 |
| 2020/0145752 | A1 | 5/2020 | Janse et al. | |
| 2020/0213726 | A1 | 7/2020 | Dyrholm | |

(Continued)

OTHER PUBLICATIONS

Extended European Search Report issued corresponding European Application No. EP 24 19 4205 dated Nov. 13, 2024.

(Continued)

*Primary Examiner* — Bhavesh M Mehta
*Assistant Examiner* — Paul J. Mueller
(74) *Attorney, Agent, or Firm* — ArentFox Schiff LLP

(57) ABSTRACT

Aspects of the present disclosure provided a method for voice control that includes transforming, using a short-time Fourier transform (STFT) applied to data in each window aligned across each input channel of the multichannel audio stream, the multichannel audio stream into a complex valued frequency-domain representation. For a current window, the method further includes: updating a first complex-valued covariance matrix corresponding to a slowly-adapting beamformer and forming a single-channel denoised estimate for each frequency band in the STFT; calculating a voice activity detection (VAD) estimate for each frequency band in the STFT by comparing a magnitude of the single-channel denoised estimate to a magnitude of each input channel of the multichannel audio stream; and selectively updating or refraining from updating, responsive to the VAD estimate respectively indicating a presence or an absence of speech, a second complex-valued covariance matrix corresponding to a quickly-adapting beamformer.

23 Claims, 11 Drawing Sheets

(56) References Cited

U.S. PATENT DOCUMENTS

2023/0098384 A1    3/2023   Adesokan et al.
2024/0121568 A1*   4/2024   Jin .................... H04M 9/082

OTHER PUBLICATIONS

Cox H, et al.: "Robust DMR and multi-rate adaptive beamforming", Signals, Systems & Computers, 1997. Conference Record of the Thirty-First Asilomar Conference on Pacific Grove, CA, USA Nov. 2-5, 1997, Los Alamitos, CA, IEEE, Comput. Soc, US, Nov. 2, 1997 (Nov. 2, 1997), pp. 920-924 vol. 1, XP032140642, DOI: 10.1109/ACSSC.1997.680577 ISBN: 978-0-8186-8316-9 *paragraph [0009]*.

* cited by examiner

METHOD AND SYSTEM FOR MULTIPLE TIME RESOLUTION AUDIO PROCESSING

TECHNICAL FIELD

Aspects of the present disclosure relate generally to systems and methods for multiple time resolution audio processing.

BACKGROUND

People are increasingly interacting with voice user interface (VUI) platforms. VUI platforms can be given commands and can be asked questions, even being responsive in some cases to gestures to issue commands and glances to get their attention. Behind all this technology is audio and video processing that incorporates many other sources of information to reason about how to best respond to a user's input.

Within the multichannel audio processing portion of a VUI, there are multiple techniques that work together. One example is acoustic echo cancellation, which helps the device listen only to the user and not to itself. Another is noise suppression.

However, there is a need for further refinement of the multichannel audio processing portion.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

According to aspects of the present disclosure, a computer-implemented method for voice control is provided. The method includes transforming, using a short-time Fourier transform (STFT) applied to data in each of a plurality of windows aligned across each input channel of the multichannel audio stream, the multichannel audio stream into a complex valued frequency-domain representation. For a current one of the plurality of windows, the method further includes updating a first complex-valued covariance matrix corresponding to a slowly-adapting beamformer and forming a single-channel denoised estimate for each frequency band in the STFT. For the current one of the plurality of windows, the method further includes calculating a voice activity detection (VAD) estimate for each frequency band in the STFT by comparing a magnitude of the single-channel denoised estimate to a magnitude of each input channel of the multichannel audio stream. For the current one of the plurality of windows, the method further includes selectively updating or refraining from updating, responsive to the VAD estimate respectively indicating a presence or an absence of speech, a second complex-valued covariance matrix corresponding to a quickly-adapting beamformer. The method includes controlling, by a hardware processor, a voice user interface based device to perform a user perceptible action, responsive to an output of at least the quickly-adapting beamformer.

According to further aspects of the present disclosure, a computer program product configured to enable voice control is provided. The computer program product includes one or more non-transitory computer-readable media, having instructions stored thereon that when executed by one or more processors cause the one or more processors, individually or in combination, to perform a method. The method includes transforming, using a short-time Fourier transform (STFT) applied to data in each of a plurality of windows aligned across each input channel of the multichannel audio stream, the multichannel audio stream into a complex valued frequency-domain representation. For a current one of the plurality of windows, the method further includes updating a first complex-valued covariance matrix corresponding to a slowly-adapting beamformer and forming a single-channel denoised estimate for each frequency band in the STFT. For the current one of the plurality of windows, the method further includes calculating a voice activity detection (VAD) estimate for each frequency band in the STFT by comparing a magnitude of the single-channel denoised estimate formed by the slowly-adapting beamformer to a magnitude of each input channel of the multichannel audio stream. For the current one of the plurality of windows, the method further includes selectively updating or refraining from updating, responsive to the VAD estimate respectively indicating a presence or an absence of speech, a second complex-valued covariance matrix corresponding to a quickly-adapting beamformer. The method includes controlling, by a hardware processor, a voice user interface based device to perform a user perceptible action, responsive to an output of at least the quickly-adapting beamformer.

According to still further aspects of the present disclosure, a voice control system is provided. The system includes one or more memories, individually or in combination, having instructions. The system further includes one or more processors each coupled to at least one of the one or more memories and configurable to execute the instructions to transform, using a short-time Fourier transform (STFT) applied to data in each of a plurality of windows aligned across each input channel of the multichannel audio stream, the multichannel audio stream into a complex valued frequency-domain representation. The one or more processors further execute the instructions to, for a current one of the plurality of windows, update, by a slowly-adapting beamformer, a first complex-valued covariance matrix corresponding to the slowly-adapting beamformer and forming, by the slowly-adapting beamformer, a single-channel denoised estimate for each frequency band in the STFT. The one or more processors further execute the instructions to, for the current one of the plurality of windows, calculate a voice activity detection (VAD) estimate for each frequency band in the STFT by comparing a magnitude of the single-channel denoised estimate formed by the slowly-adapting beamformer to a magnitude of each input channel of the multichannel audio stream. The one or more processors further execute the instructions to, for the current one of the plurality of windows, selectively update or refraining from updating, responsive to the VAD estimate respectively indicating a presence or an absence of speech, a second complex-valued covariance matrix corresponding to a quickly-adapting beamformer. The one or more processors further execute the instructions to, control a voice user interface based device to perform a user perceptible action, responsive to an output of at least the quickly-adapting beamformer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
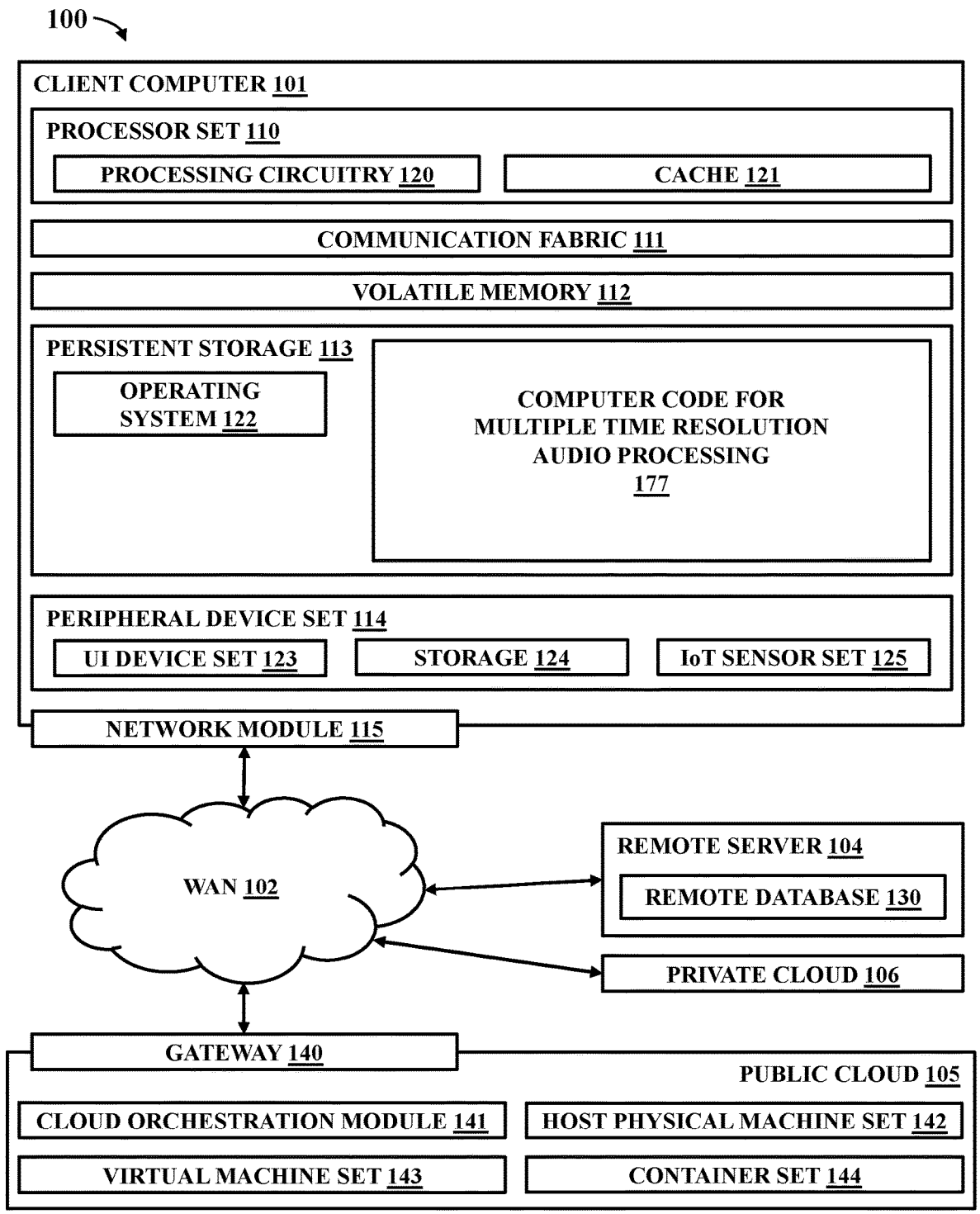
FIG. 1 illustrates a block diagram of an example of a computer environment, in accordance with example aspects of this disclosure.

Aspects of the present disclosure are directed to a method and system for multiple time resolution audio processing.

In an aspect, two beamformers, a slowly-adapting beamformer and a quickly adapting beamformer, adapt at different rates to enhance, for example, voice user interface (VUI) performance.

In an aspect, the inputs to the system are a multichannel audio stream from a microphone array and a desired source direction-of-arrival (DOA). The multichannel audio stream is transformed to a complex-valued frequency-domain representation by Fourier transform of overlapping windows (a.k.a. frames) aligned across all input channels. This is commonly known as a short-time Fourier transform (STFT). That is, a SHTF is a transform that converts a function into a form that describes the frequencies present in the original function. The output of the transform is a complex-valued function of frequency.

In an aspect, frequency-domain processing is applied to the complex-valued frequency-domain representation of the data and a standard inverse STFT and overlap-add procedure are used to transform the processed audio from the frequency domain back to the time domain. The resulting time-domain signal is the output of the system.

In an aspect, the algorithm works by tracking two complex-valued covariance matrices for each frequency band in the Fourier transform, namely, one for the slowly adapting beamformer and the other for the quickly-adapting beamformer. In an aspect, both beamformers use the same equation for the update rule, but with a different setting for the parameter that sets the adaptation speed. In another aspect, the beamformers use different equations for the update rule, and different settings for the parameter that sets the adaptation speed.

In an aspect, after the covariance matrices are updated, a minimum variance distortionless response (MVDR) beamformer vector and/or minimum power distortionless response (MPDR) are calculated at each frequency given the current window's frequency-domain representation and multiplied with the corresponding beamformer weight vector of the input STFT to produce a single-channel denoised result. A single-channel denoised result is determined from subtracting a noise signal from a single input channel of input multichannel audio stream. The beamformer weight vector may be an M×N vector, with M being an integer representing the number of sensor (microphone) elements, and N being an integer representing a direction-of-arrival (DOA). In a given window, this process of updating the covariance and forming the single-channel denoised estimate is applied in the slow beamformer first. Then, in an aspect, a voice activity detection (VAD) estimate is calculated for each frequency bin (band) by comparing the magnitudes of the denoised estimate output by the slow beamformer to the magnitudes in any channel of the raw signal to see if they differ within a threshold amount. This threshold amount may be chosen empirically.

In an aspect, the VAD estimate is used to determine whether the data in the current frame should be used to update the fast beamformer's covariance matrix or not. If the VAD indicates that speech is present, then the fast beamformer updates the fast beamformer covariance matrix. Otherwise, the fast beamformer does update the fast beamformer covariance matrix.

In an aspect, the output of the fast beamformer is used as the output of the full voice user interface system. In effect, the slow beamformer adapts slowly to the acoustic background and is not affected as much as the fast beamformer by speech, which is relatively transient in time. The VAD that the slow beamformer outputs informs the fast beamformer when speech is present so that the slow beamformer can adapt not just quickly but more accurately to the fluctuations in the target speech signal than in the case where a single beamformer is used for both noise and signal. This enhances the performance of the overall denoising system as compared to the output of a single beamformer. This all assumes that the target DOA is known (given or estimated by some means). By particularly constraining the quickly-adapting beamformer to only speech, the performance of the quickly-adapting beamformer will be improved over a single beamformer processing both noise and speech. This is because background changes much more slowly than the speaker; and fast adapting beamformers have a higher noise floor than slow adapting beamformers. Thus, having the fast adaptive beamformer only adapt to the speech is helpful to allow the slow one to adapt to noise, and also the fast one can adapt to the fast changing speech signal. Moreover, various aspects of the present disclosure enable the noise to be averaged over a long time slowly by the slowly-adapting beamformer in order to capture the stationarity of noise by the use of a slow adaptation rate as compared to the quickly-adapting beamformer.

Methods in accordance with various aspects may be performed on-line or off-line. In an aspect, the on-line implementation may use a first buffer for collecting the input samples and a second buffer for outputting the processed audio. The covariance update and beamformer vector calculation steps can be rewritten in a mathematically equivalent form to avoid computing matrix inversions. After this, all the operations consist only of matrix-vector products, vector-vector products, scalar divisions, and other such simple algebraic operations. This makes the implementation much more hardware-friendly and significantly speeds up the run-time, allowing multiple such beamformers to be run on an embedded device simultaneously, compared to when the covariance update and beamformer vector calculation steps are not written to be mathematically equivalent.

Referring to FIG. 1, an example computing environment 100 is shown, in accordance with an aspect of the present disclosure.

Computing environment 100 includes an example of an environment for the execution of at least some of the computer code 177 involved in performing the methods, such as multiple time resolution audio processing. The, computing environment 100, in addition to computer code 177, further includes for example, client computer 101, wide area network (WAN) 102, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 177, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though computer 101 is not shown in a cloud in FIG. 1. On the other hand, computer 101 is not required to be in a cloud except to any extent as may be affirmatively indicated. Computer 101 may be interchangeably referred to herein as "voice user interface (VUI)-based device" 101.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 177 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101. Relating to an online aspect, volatile memory 112 may include a first buffer 112A for collecting input samples and a second buffer 112B for outputting the processed audio.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 177 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as one or more of a display screen, speaker, microphone array, wearable devices (such as goggles and smart watches), keyboard, mouse, printer, touchpad, virtual reality goggles, augmented reality goggles, mixed reality goggles, game controllers, a voice user interface (VUI), an automatic speech recognition system (ASR), a text-to-speech (TTS) system, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of one or more sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Public cloud 105 may provide a subscription service for people interaction to a plurality of users such as a user of computer 101. The service can have multiple purposes for people interaction. Such purposes for people interaction can include dating, friendship, and business.

In an aspect, public cloud 105 operates in conjunction with remote server 104 to enable profile information of users to be retrieved and provided to a user such as one using computer 101 and/or another user operating a similar device as computer 101.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
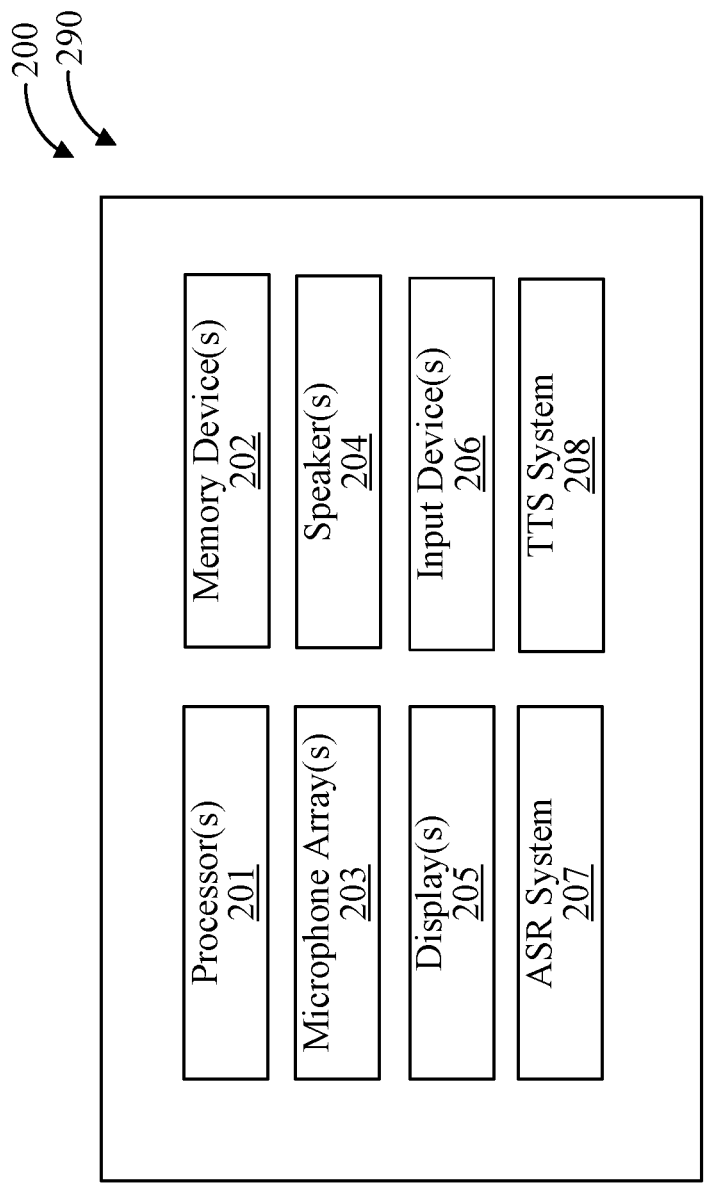
FIG. 2 illustrates a block diagram of another client computer relative to that shown in FIG. 1, in accordance with example aspects of this disclosure.

Referring to FIG. 2, another client computer 200 is shown, in accordance with various aspects of the present disclosure.

The client computer 200 is one variation of client computer 101 of FIG. 1, and may interface with the same devices as shown in FIG. 1. The client device 200 may be interchangeably referred to as "voice user interface (VUI)-based device" 200.

The VUI-based device 200 may include a voice user interface 290 including or interfacing with any of the following elements: one or more processors 201; one or more memory devices 202 operatively coupled to the one or more processors 201; one or more microphone arrays 203; one or more speakers 204; one or more displays 205; one or more input devices 206; one of more automatic speech recognition (ASR) systems 207; and one or more text-to-speech (TTS) systems 208.

The one or more processors 201 and the one or more memory devices 202 are configured to run program code to execute a method such as method 600.

The one or more microphone arrays 203 are configured to receive speech and background noise that are used in a manner as described herein to improve the audio processing by the VUI-based device 200. In particular, the approach described herein uses a slowly-adapting beamformer to determine when to have a quickly adapting beamformer selectively update a covariance matrix corresponding to the quickly-adapting beamformer.

The one or more speakers 204 are configured to reproduce sounds such as user prompts, response to user commands and/or user inquires, and so forth.

The one or more displays 205 may display a status of the device (e.g., an LED showing power) as well as response to user commands and/or user inquiries and other information pertinent to the use of the device by the user.

The one or more input devices 206 may be used to power up or power down the device, adjust a volume, enter network information including network name and password, and so forth.

The one or more ASR systems 207 are configured to decode utterances in one or more languages. In other aspects, a single ASR may be used with different language models for different languages and/or different domains (work, home, etc.).

The one or more TTS systems 208 are configured to convert responses to user commands and/or user inquiries into speech that is reproduced by the one or more speakers 204.

Figure 3:
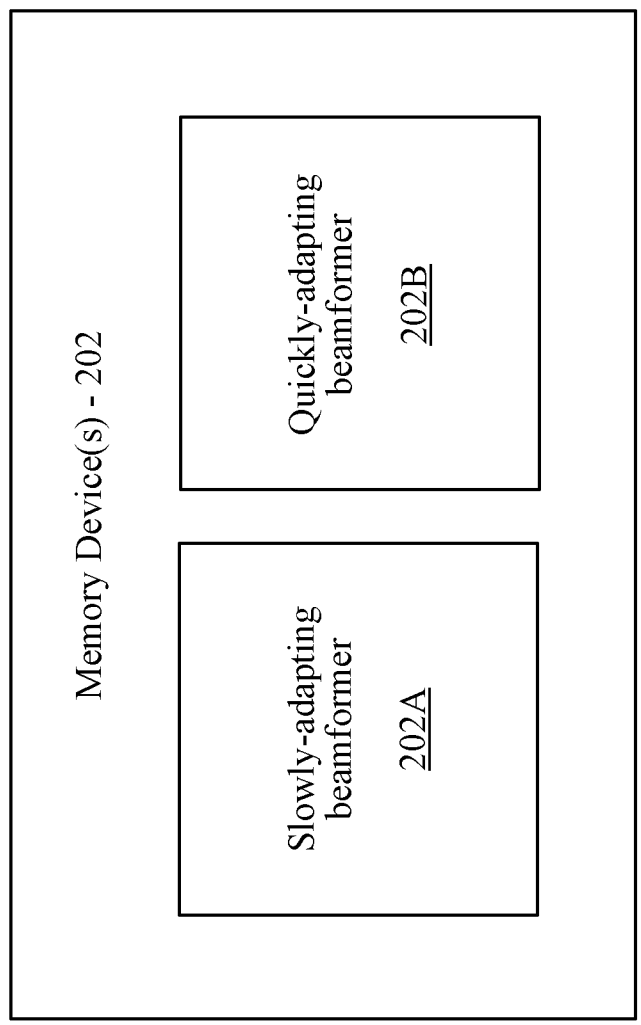
FIG. 3 illustrates a block diagram of the one or more memory devices of FIG. 2, in accordance with example aspects of this disclosure.

Referring to FIG. 3, the one or more memory devices 202 of FIG. 2 are further shown, in accordance with various aspects of the present disclosure.

The one or more memory devices 202 include a slowly-adapting beamformer 202A and a quickly adapting beamformer 202B. The one or more processors 201 execute code corresponding to the slowly-adapting beamformer 202A and the quickly-adapting beamformer 202B in order to perform multiple time resolution processing as described herein. Beamforming is a signal processing technique used in sensor arrays, such as microphones, for directional signal transmission or reception.

The slowly-adapting beamformer 202A is configured to slowly adapt to the background including background noise to account for the stationarity of noise.

The quickly-adapting beamformer 202B is configured to quickly adapt to speech to account for the transientness of speech.

In an aspect, the relative rates of "slowly" and "quickly" are achieved by using the same equation for the covariance matrix update rule, but with different adaptation speeds with the slowly-adapting beamformer 202A being slower than the quickly-adapting beamformer 202B.

In an aspect, for each of a plurality of windows aligned across each input channel of a multichannel audio stream, an STFT is applied to data in the windows (frames).

For a current window, a voice activity detection (VAD) estimate is generated after updating a covariance matrix corresponding to the slowly-adapting beamformer 202B that is used, along with a direction-of-arrival, to selectively update or refrain from updating a covariance matrix corresponding to the quickly-adapting beamformer. In this way, the quickly-adapting beamformer can more quickly and more accurately adapt to fluctuations in a target speech signal this enhancing the performing of the overall denoising system as compared to the output of a single beamformer which must account for both speech and noise and is then general to both and not specific to any.

Figure 4:
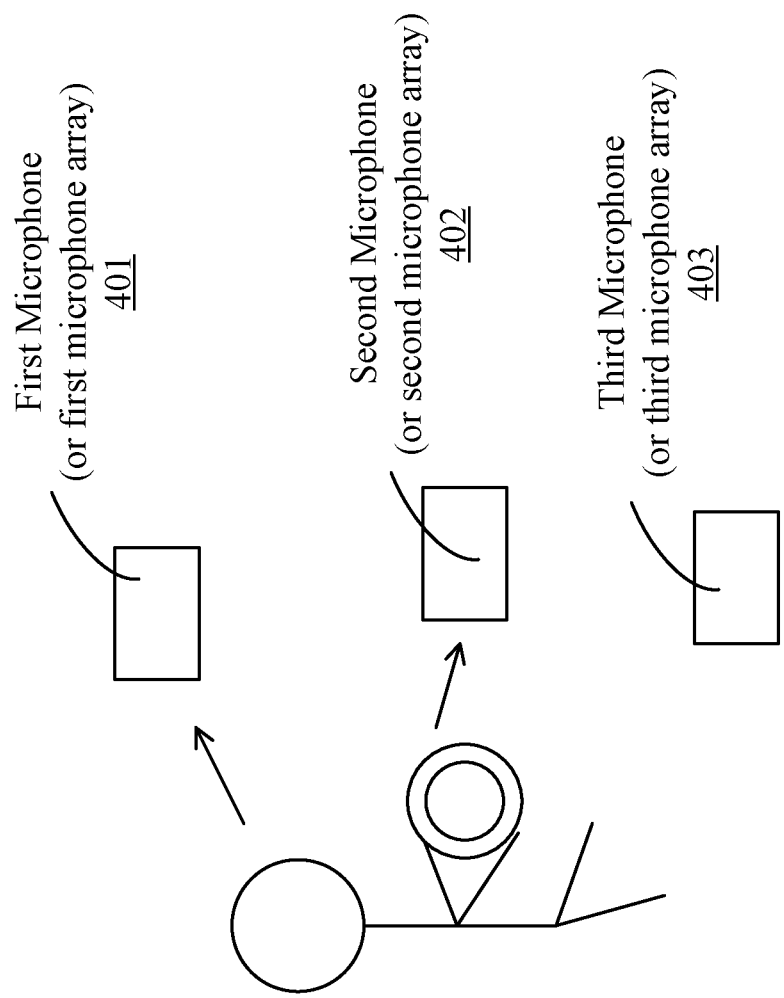
FIG. 4 further illustrates a block diagram of the one or more memory devices of FIG. 2, in accordance with example aspects of this disclosure.
Figure 5:
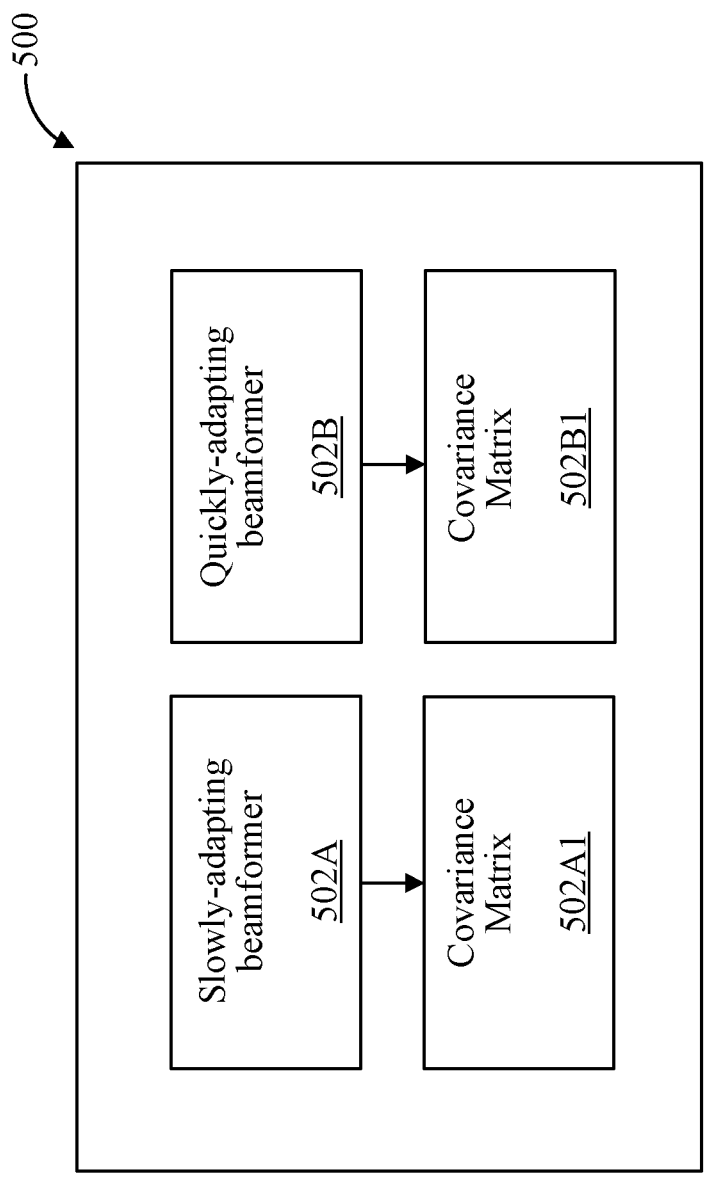
FIG. 5 illustrates a block diagram of an example user environment, in accordance with example aspects of this disclosure.
Figure 6:
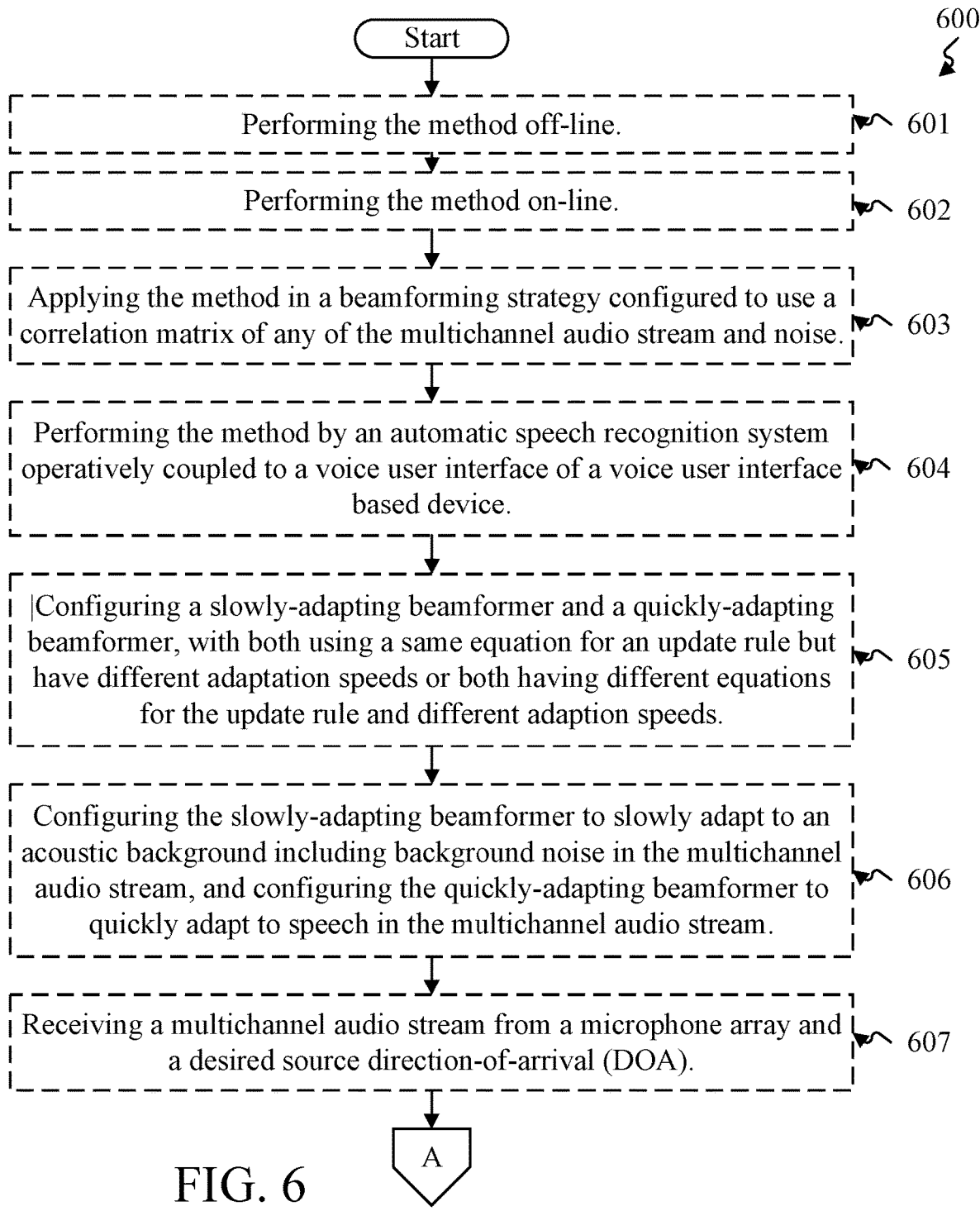
FIGS. 6-10 illustrate a flowchart of an example of a method for multiple time resolution audio processing and voice control, in accordance with example aspects of this disclosure.
Figure 7:
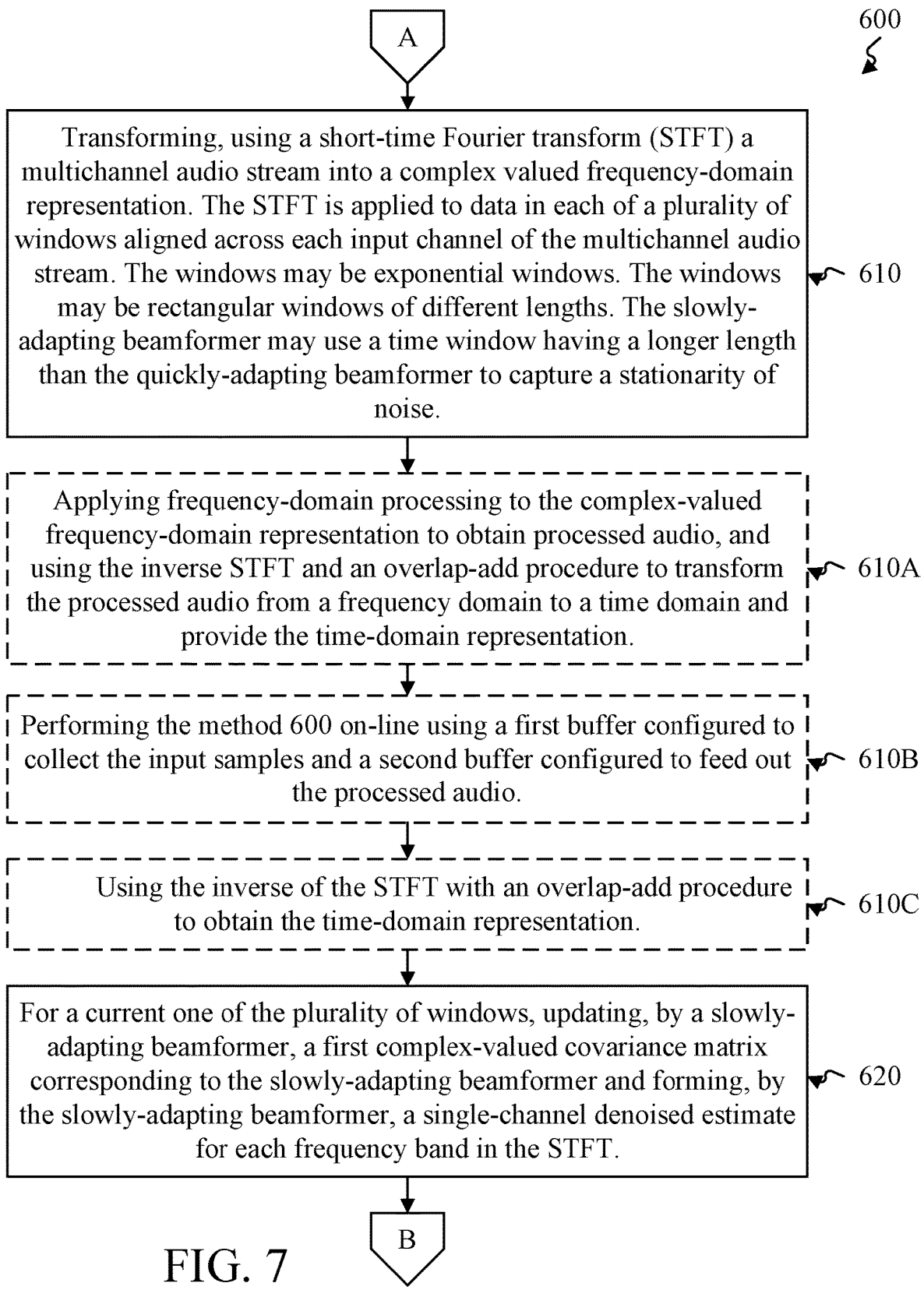
Figure 8:
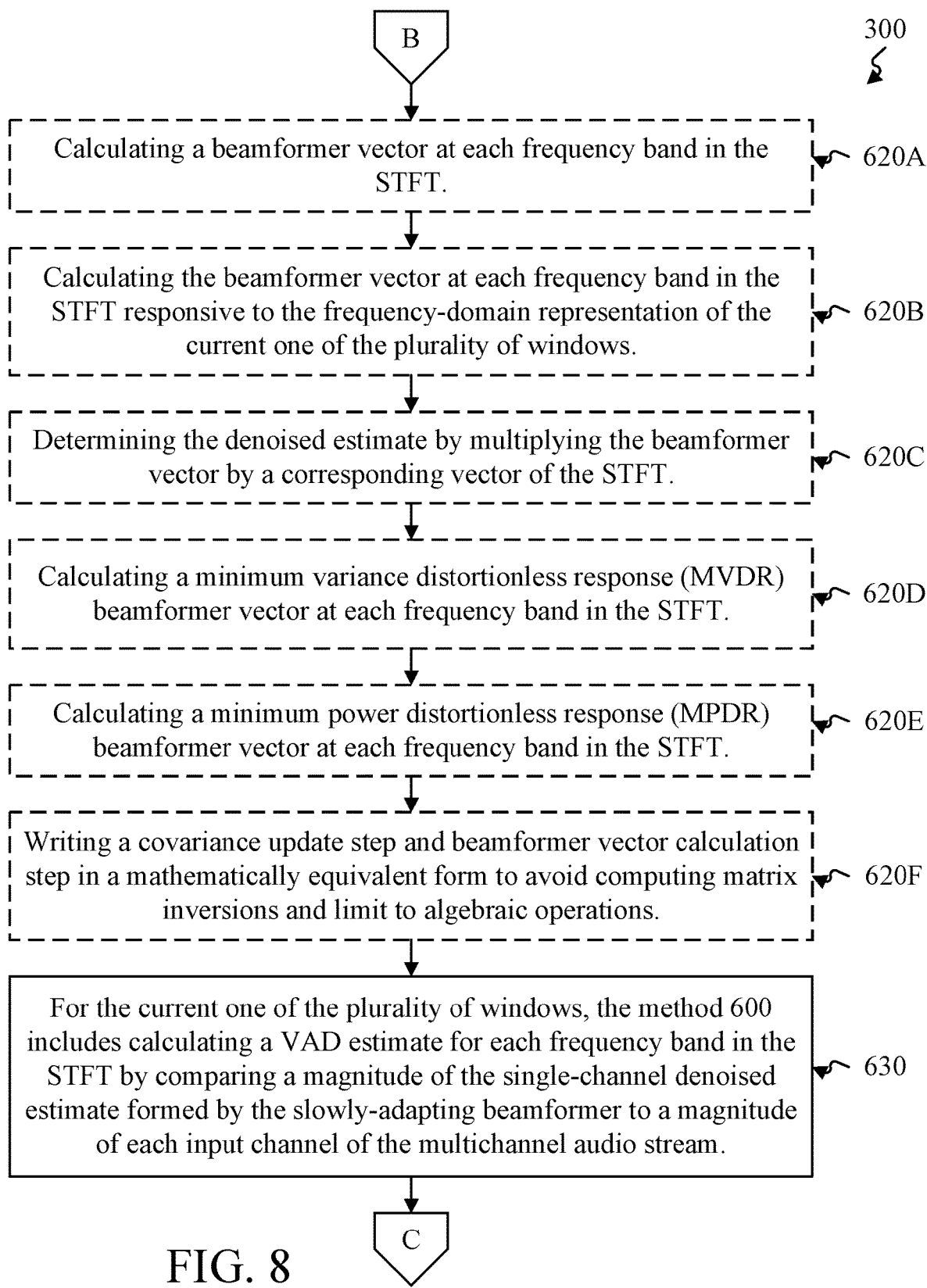
Figure 9:
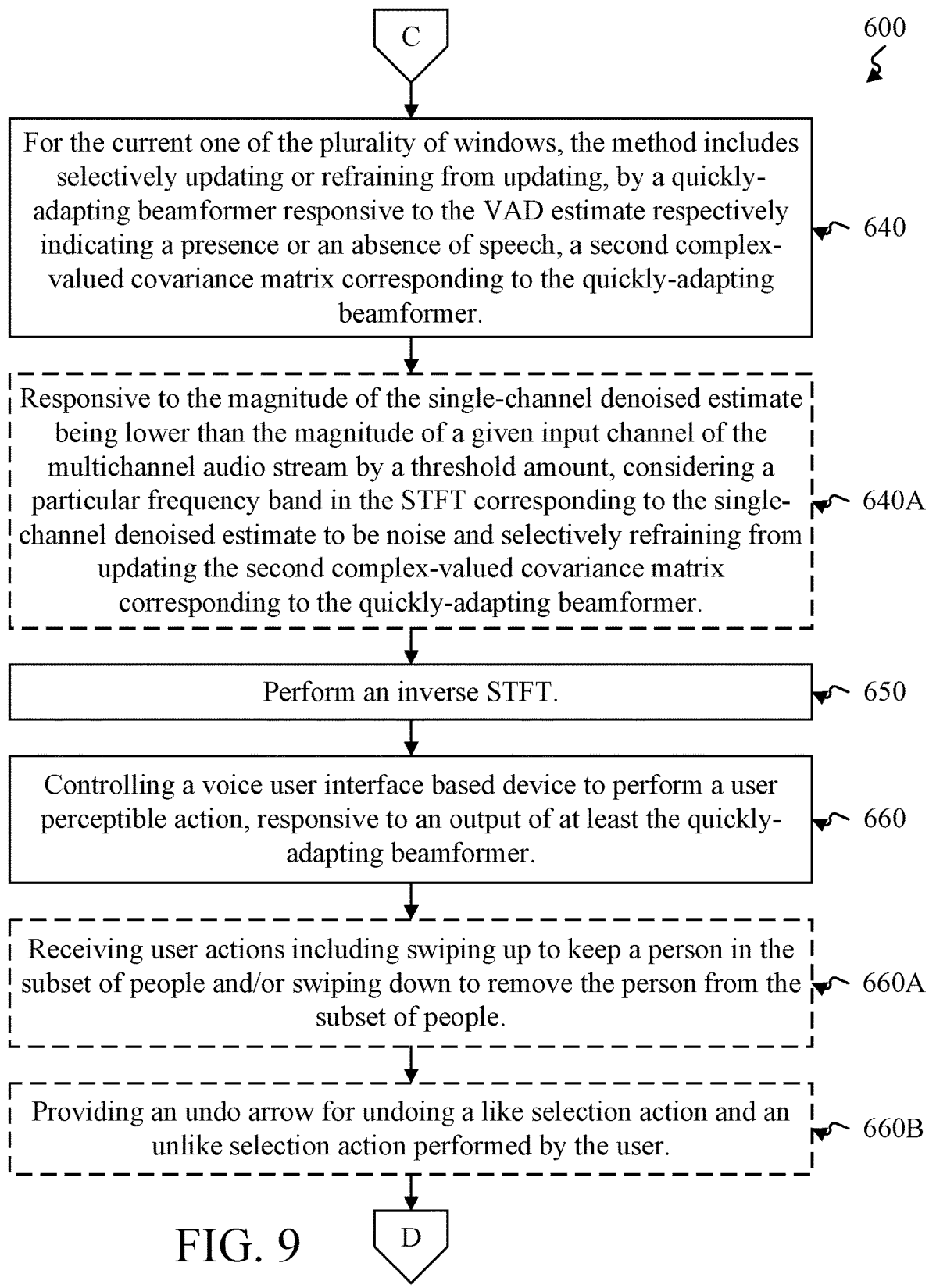
Figure 10:
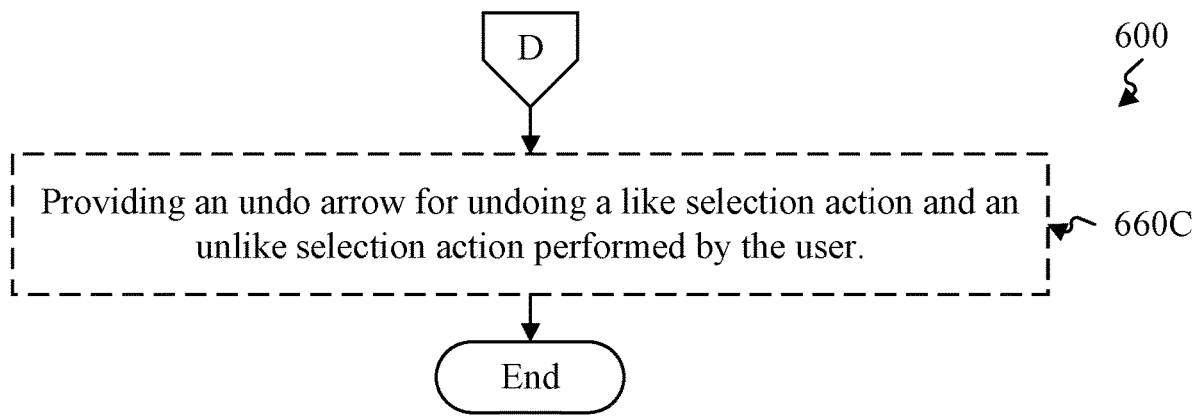

Referring to FIG. 4, the one or more memory devices 202 of FIG. 2 are further shown, in accordance with various aspects of the present disclosure. Referring to FIG. 5, a user environment 500 is shown, in accordance with various aspects of the present disclosure.

The one or more memory devices 202 include a slowly-adapting beamformer 202A and a quickly adapting beamformer 202B. The one or more processors 201 execute code corresponding to the slowly-adapting beamformer 202A and the quickly-adapting beamformer 202B.

A covariance matrix 502A1 corresponds to the slowly-adapting beamformer 202A, and thus corresponds to noise. A covariance matrix 502B1 corresponds to the quickly-adapting beamformer 202B and thus corresponds to speech. A covariance matrix is a square matrix giving the covariance between each pair of elements of a given random vector. Here, the vector is the beamforming vector described herein.

A short-time Fourier Transform is applied to each of a plurality of windows aligned across each input channel of a multichannel audio stream.

For each window, the code/algorithm slowly updates the covariance matrix 502A1 corresponding to the slowly-adapting beamformer 202A while selectively updating the covariance matrix 502B1 corresponding to the quickly-adapting beamformer 202B in order to better adapt to speech. The statistics of speech change quicker than the statistics of noise. In other words speech is "less stationary" than noise, so the statistics need to be adapted faster. This is what the "fast-adaptive" beamformer is able to achieve, by forgetting the past faster (i.e., having a shorter effective memory window).

Thus, for each current window being processed that relates to a frequency band of the STFT, a covariance matrix for the slowly-adapting beamformer 202A is updated and a VAD is formed. Based on the VAD indicating an absence or presence of speech, a covariance matrix for the quickly adapting beamformer 202B is respectively updated or not updated.

Referring to FIG. 5, a user environment 500 is shown, in accordance with various aspects of the present disclosure.

The user environment 500 corresponds to the interior of a motor vehicle and includes a first microphone 501, a second microphone 502, and a third microphone 503 for receiving speech such as, for example, user commands and/or user inquiries. In another aspect, first microphone 501, second microphone 502, and third microphone 503 may each be microphone arrays. These and other variations are encompassed by aspects of the present disclosure. The microphones are arranged to have a known or readily determinable direction of arrival (DOA). The DOA is used to calculate the minimum variance distortionless response (MVDR) and/or minimum power distortionless response (MPDR).

The microphone or microphone arrays 501-503 may be arranged to be directional and optimized to capture speech of various seating positions while minimizing the capture of background noise. Hence, in an embodiment, they may be directed away from the motor and/or other sources of noise, and directed towards the mouth of a user (driver and/or passenger(s)).

In an aspect, speech captured in the driver's direction is weighted more heavily than speech captured in a passengers direction. In an aspect, front seat passengers are weighted more heavily than back seat passengers.

Referring now to FIGS. 6-10, a method 600 for multiple time resolution audio processing and voice control is shown and described in accordance with various exemplary aspects. Boxes shown in dashes are optional features.

Method 600 may be performed by one or more processors (e.g., processor set 110 of FIG. 1 and processors 201 of FIG. 2) operatively coupled to one or more memories (e.g., persistent storage 113 of FIG. 1 and memory devices 202 of FIG. 2). The slowly-adapting beamformer 502A and the quickly-adapting beamformer 502B may be implemented by computer code (e.g., computer code 177 of FIG. 1 and slowly-adapting beamformer 502A and quickly-adapting beamformer 502B).

At block 601, the method 600 includes performing the method 600 off-line. This involves updating the coefficients for the beamformers off-line.

At block 602, the method 600 includes performing the method 600 on-line. This involves updating the coefficients for the beamformers online.

In an aspect, both off-line and on-line approaches may be combined such that, for example, an initialization may be performed using the off-line method, and then the online method is used when a new frequency snapshot is obtained.

At block 603, the method 600 includes applying the method 600 in a beamforming strategy configured to use a correlation matrix of any of the multichannel audio stream and noise.

At block 604, the method 600 includes performing the method 600 by an automatic speech recognition system 207 operatively coupled to a voice user interface 290 of a voice user interface based device 200.

At block 605, the method 600 includes configuring a slowly-adapting beamformer 202A and a quickly-adapting beamformer 202B, with both using a same equation for an update rule but have different adaptation speeds or both having different equations for the update rule and different adaption speeds.

At block 606, the method 600 includes configuring the slowly-adapting beamformer 202A to slowly adapt to an acoustic background including background noise in the multichannel audio stream, and configuring the quickly-adapting beamformer 202B to quickly adapt to speech in the multichannel audio stream.

At block 607, the method 600 includes receiving a multichannel audio stream from a microphone array 203 and a desired source direction-of-arrival (DOA).

At block 610, the method 600 includes transforming, using a short-time Fourier transform (STFT) and an inverse STFT, a multichannel audio stream into a complex valued frequency-domain representation and back into a time-domain representation. The STFT is applied to data in each of a plurality of windows aligned across each input channel of the multichannel audio stream. In an aspect, the windows may be exponential windows. In an aspect, the windows may be rectangular windows of different lengths. In an aspect, the slowly-adapting beamformer may use a time window having a longer length than the quickly-adapting beamformer to capture a stationarity of noise.

In an aspect, block 610 may include one or more of blocks 610A through 610B.

At block 610A, the method 600 includes applying frequency-domain processing to the complex-valued frequency-domain representation to obtain processed audio, and using the inverse STFT and an overlap-add procedure to transform the processed audio from a frequency domain to a time domain and provide the time-domain representation.

At block 610B, the method 600 includes performing the method 600 on-line using a first buffer configured to collect the input samples and a second buffer configured to feed out the processed audio.

At block 610C, the method 600 includes using the inverse of the STFT with an overlap-add procedure to obtain the time-domain representation.

At block 620, for a current one of the plurality of windows, the method 600 includes updating, by a slowly-adapting beamformer 202A, a first complex-valued covariance matrix 202A1 corresponding to the slowly-adapting beamformer 202A and forming, by the slowly-adapting beamformer 202A, a single-channel denoised estimate for each frequency band in the STFT.

In an aspect, block 620 may include one or more of blocks 620A through 620F.

At block 620A, the method 600 includes calculating a beamformer vector at each frequency band in the STFT.

At block 620B, the method 600 includes calculating the beamformer vector at each frequency band in the STFT responsive to the frequency-domain representation of the current one of the plurality of windows. The beamform vector is calculated to maximize (e.g., amplify) signal in the DOA and minimize (e.g., attenuate) signal outside the DOA. To that end, various types of beamforming vectors can be used, some of which are described below with respect to blocks 620D and 620E.

At block 620C, the method 600 includes determining the denoised estimate by multiplying the beamformer vector by a corresponding beamformer weight vector of the STFT. The beamformer weight vector may be an M×N vector, with M representing the number of sensor (microphone) elements, and N representing a direction-of-arrival (DOA).

At block 620D, the method 600 includes calculating a minimum variance distortionless response (MVDR) beamformer vector at each frequency band in the STFT.

At block 620E, the method 600 includes calculating a minimum power distortionless response (MPDR) beamformer vector at each frequency band in the STFT.

At block 620F, the method 600 includes writing a covariance update step and beamformer vector calculation step in a mathematically equivalent form to avoid computing matrix inversions and limit to algebraic operations.

At block 630, for the current one of the plurality of windows, the method 600 includes calculating a voice activity detection (VAD) estimate for each frequency band in the STFT by comparing a magnitude of the single-channel denoised estimate formed by the slowly-adapting beamformer 202A to a magnitude of each input channel of the multichannel audio stream.

At block 640, for the current one of the plurality of windows, the method 600 includes selectively updating or refraining from updating, by a quickly-adapting beamformer 202B responsive to the VAD estimate respectively indicating an absence or a presence of speech, a second complex-valued covariance matrix corresponding to the quickly-adapting beamformer 202B.

In an aspect, block 640 may include block 640A.

At block 640A, the method 600 includes, responsive to the magnitude of the single-channel denoised estimate being lower than the magnitude of a given input channel of the multichannel audio stream by a threshold amount, considering a particular frequency band in the STFT corresponding to the single-channel denoised estimate to be noise and selectively refraining from updating the second complex-valued covariance matrix 220B1 corresponding to the quickly-adapting beamformer 202B.

At block 650, the method 600 includes performing an inverse STFT.

At block 660, the method 600 includes controlling a voice user interface 290 based device 200 to perform a user perceptible action, responsive to an output of at least the quickly-adapting beamformer 202B. In an aspect, the output of the slowly-adapting beamformer 202A may also be used together with the output of the quickly-adapting beamformer 202B.

In an aspect, block 660 may include one or more of blocks 660A through 660C.

At block 660A, the method 600 includes performing the method 600 by an automatic speech recognition system 207 configured to convert the speech to commands to control the voice user interface based device 200 to perform the user perceptible action.

At block 660B, the method 600 includes weighting speech captured from a driver's location more heavily than speech captured from a passenger's location.

At block 660C, the method 600 includes weighting speech captured from a front seat passenger's location more heavily than speech captured from a back seat passenger's location.

Figure 11:
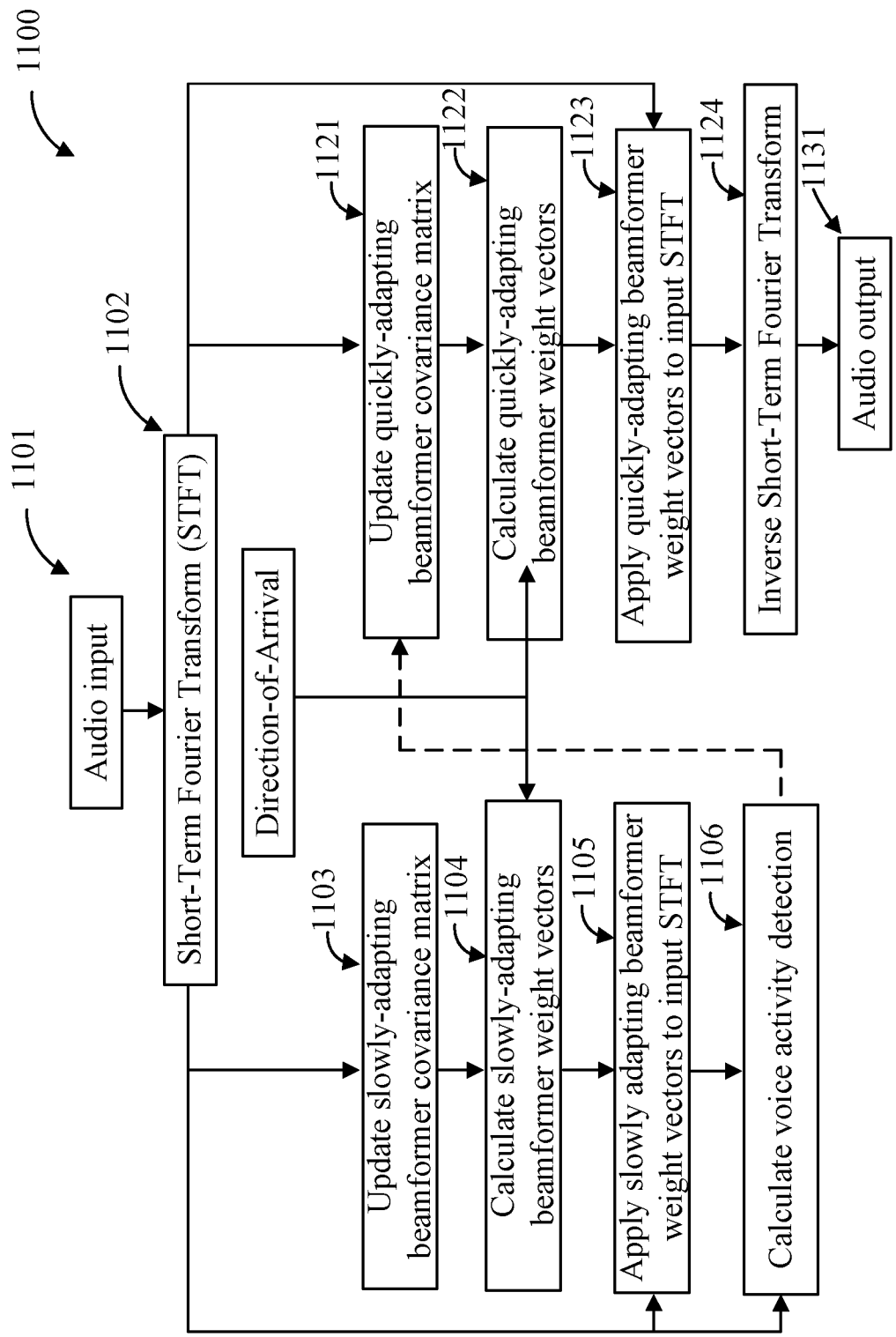
FIG. 11 illustrates a block diagram of an example of dual beamformer processing, in accordance with example aspects of this disclosure.

Referring to FIG. 11, dual beamformer processing 1100 is shown, in accordance with various aspects of the present disclosure. The dual beamformer processing 1100 is an overview of method 600 of FIGS. 6-10.

The dual beamformer processing 1100 involves a short-time Fourier transform (SHFT) 1102 for transforming a multichannel audio stream (audio input 1101) into a complex valued frequency-domain representation.

The dual beamformer processing 1100 involves updating 1103 a slowly-adapting beamformer covariance matrix 502A1, calculating 1104 slowly-adapting beamformer weight vectors based on the DOA, applying 1105 the slowly-adapting beamformer weight vectors to the input STFT, calculating 1106 a voice activity detection (VAD) estimate.

The dual beamformer processing 1100 further involves updating 1121 a quickly-adapting covariance matrix 502B1 responsive to a VAD estimate indicating a presence of speech, calculating 1122 quickly-adapting beamformer weight vectors based on the DOA, applying 1123 the quickly-adapting beamformer weight vectors to the input STFT, performing 1124 an inverse short term Fourier transform, and outputting 1131 audio to a device, e.g., to control the device to perform an action such as, e.g., a user perceptible action. Such action can include an inquiry, a command (e.g., play music, tell me the Weather, etc.), and so forth.

In an aspect, applying (1105 and/or 1123) the beamformer weight vectors comprises applying the weights in the vectors to the magnitudes of each band of the STFT.

Various aspects of the disclosure may take the form of an entirely or partially hardware aspect, an entirely or partially software aspect, or a combination of software and hardware. Furthermore, as described herein, various aspects of the disclosure (e.g., systems and methods) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, and so forth.

Aspects of this disclosure are described herein with reference to block diagrams and flowchart illustrations of methods, systems, apparatuses, and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, a special-purpose computer, or another programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps, or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of aspects described in the specification or annexed drawings; or the like.

As used in this disclosure, including the annexed drawings, the terms "component," "module," "system," and the like are intended to refer to a computer-related entity or an entity related to an apparatus with one or more specific functionalities. The entity can be either hardware, a combination of hardware and software, software, or software in execution. One or more of such entities are also referred to as "functional elements." As an example, a component can be a process running on a processor, a processor, an object, an executable, a thread of execution, a program, and/or a computer. For example, both an application running on a server or network controller, and the server or network controller can be a component. One or more components can reside within a process and/or thread of execution and a component can be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which parts can be controlled or otherwise operated by program code executed by a processor. As yet another example, a component can be an apparatus that provides specific functionality through electronic components without mechanical parts, the electronic components can include a processor to execute program code that provides, at least partially, the functionality of the electronic components. As still another example, interface(s) can include I/O components or Application Programming Interface (API) components. While the foregoing examples are directed to aspects of a component, the exemplified aspects or features also apply to a system, module, and similar.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should be construed to mean "one or more" unless specified otherwise or clear from context to be directed to a singular form.

In addition, the terms "example" and "such as" are utilized herein to mean serving as an instance or illustration. Any aspect or design described herein as an "example" or referred to in connection with a "such as" clause is not necessarily to be construed as preferred or advantageous over other aspects or designs described herein. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time or space.

The term "processor," as utilized in this disclosure, can refer to any computing processing unit or device comprising processing circuitry that can operate on data and/or signaling. A computing processing unit or device can include, for example, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. In some cases, processors can exploit nano-scale architectures, such as molecular and quantum-dot based transistors, switches and gates, in order to optimize space usage or enhance performance of user equipment. A processor may also be implemented as a combination of computing processing units.

In addition, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

Simply as an illustration, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects described herein can be implemented as a method, apparatus, or article of manufacture using standard programming and/or engineering techniques. In addition, various of the aspects disclosed herein also can be implemented by means of program modules or other types of computer program instructions stored in a memory device and executed by a processor, or other combination of hardware and software, or hardware and firmware. Such program modules or computer program instructions can be loaded onto a general-purpose computer, a special-purpose computer, or another type of programmable data processing apparatus to produce a machine, such that the instructions which execute on the computer or other programmable data processing apparatus create a means for implementing the functionality of disclosed herein.

The term "article of manufacture" as used herein is intended to encompass a computer program accessible from any computer-readable device, carrier, or media. For example, computer readable media can include but are not limited to magnetic storage devices (e.g., hard drive disk, floppy disk, magnetic strips, or similar), optical discs (e.g., compact disc (CD), digital versatile disc (DVD), blu-ray disc (BD), or similar), smart cards, and flash memory devices (e.g., card, stick, key drive, or similar).

The detailed description set forth herein in connection with the annexed figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well-known components are shown in block diagram form, while some blocks may be representative of one or more well-known components.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for voice control, comprising:
   transforming, using a short-time Fourier transform (STFT) applied to data in each of a plurality of windows aligned across each input channel of a multichannel audio stream, the multichannel audio stream into a complex valued frequency-domain representation,
   wherein for a current one of the plurality of windows, the method comprises:

updating a first complex-valued covariance matrix corresponding to a slowly-adapting beamformer and forming a single-channel denoised estimate for each frequency band in the STFT;

calculating a voice activity detection (VAD) estimate for each frequency band in the STFT by comparing a magnitude of the single-channel denoised estimate to a magnitude of each input channel of the multichannel audio stream; and selectively updating or refraining from updating, responsive to the VAD estimate respectively indicating a presence or an absence of speech, a second complex-valued covariance matrix corresponding to a quickly-adapting beamformer; and controlling, by a hardware processor, a voice user interface based device to perform a user perceptible action, responsive to an output of at least the quickly-adapting beamformer.

2. The method in accordance with claim 1, further comprising configuring the slowly-adapting beamformer and the quickly-adapting beamformer to use different equations for an update rule and different adaptation speeds.

3. The method in accordance with claim 1, further comprising configuring the slowly-adapting beamformer and the quickly-adapting beamformer to both use a same equation for an update rule, but have different adaptation speeds.

4. The method in accordance with claim 3, further comprising:
configuring the slowly-adapting beamformer to slowly adapt to an acoustic background including background noise in the multichannel audio stream; and
configuring the quickly-adapting beamformer to quickly adapt to speech in the multichannel audio stream.

5. The method in accordance with claim 1, wherein the method further comprises, responsive to the magnitude of the single-channel denoised estimate being lower than the magnitude of a given input channel of the multichannel audio stream by a threshold amount, considering a particular frequency band in the STFT corresponding to the single-channel denoised estimate to be noise and selectively refraining from updating the second complex-valued covariance matrix corresponding to the quickly-adapting beamformer.

6. The method in accordance with claim 1, further comprising applying the method in a beamforming strategy configured to use a correlation matrix of any of the multichannel audio stream and noise.

7. The method in accordance with claim 1, wherein forming the single-channel denoised estimate comprises calculating a beamformer vector at each frequency band in the STFT.

8. The method in accordance with claim 7, wherein the beamformer vector is calculated at each frequency band in the STFT responsive to the frequency-domain representation of the current one of the plurality of windows.

9. The method in accordance with claim 7, wherein the single-charmed denoised estimate is determined by multiplying the beamformer vector by a corresponding beamformer weight vector of the STFT.

10. The method in accordance with claim 1, wherein forming the single-channel denoised estimate comprises calculating a minimum variance distortionless response (MVDR) beamformer vector at each frequency band in the STFT.

11. The method in accordance with claim 1, wherein forming the single-channel denoised estimate comprises calculating a minimum power distortionless response (MPDR) beamformer vector at each frequency band in the STFT.

12. The method in accordance with claim 1, further comprising receiving the multichannel audio stream from a microphone array and a desired source direction-of-arrival (DOA).

13. The method in accordance with claim 1, wherein the transforming comprises applying frequency-domain processing to the complex valued frequency-domain representation to obtain processed audio, and the method further includes using an inverse STFT and an overlap-add procedure to transform the processed audio from a frequency domain to a time domain and provide a time-domain representation.

14. The method in accordance with claim 13, further comprising performing the method on-line using a first buffer configured to collect input samples and a second buffer configured to feed out the processed audio.

15. The method in accordance with claim 1, further comprising performing the method by an automatic speech recognition system operatively coupled to a voice user interface of the voice user interface based device and configured to convert the speech to commands to control the voice user interface based device to perform the user perceptible action.

16. The method in accordance with claim 1, wherein the plurality of windows are exponential windows.

17. The method in accordance with claim 1, wherein the plurality of windows are rectangular windows of different lengths, wherein the slowly-adapting beamformer uses a time window having a longer length than the quickly-adapting beamformer to capture a stationarity of time.

18. The method in accordance with claim 1, wherein the method is performed off-line.

19. The method in accordance with claim 1, further comprising writing a covariance update step and beamformer vector calculation step in a mathematically equivalent form to avoid computing matrix inversions and limit to algebraic operations.

20. The method in accordance with claim 1, further comprising weighting speech captured from a driver's location more heavily than speech captured from a passenger's location.

21. The method in accordance with claim 1, further comprising weighting speech captured from a front seat passenger's location more heavily than speech captured from a back seat passenger's location.

22. A computer program product configured to enable voice control, the computer program product comprising one or more non-transitory computer-readable media, having instructions stored thereon that when executed by one or more processors cause the one or more processors, individually or in combination, to perform a method comprising:
transforming, using a short-time Fourier transform (STFT) applied to data in each of a plurality of windows aligned across each input channel of a multichannel audio stream, the multichannel audio stream into a complex valued frequency-domain representation,
wherein for a current one of the plurality of windows, the method comprises:
updating a first complex-valued covariance matrix corresponding to a slowly-adapting beamformer and forming a single-channel denoised estimate for each frequency band in the STFT;
calculating a voice activity detection (VAD) estimate for each frequency band in the STFT by comparing a magnitude of the single-channel denoised estimate to a magnitude of each input channel of the multichannel audio stream; and selectively updating or refraining from updating, responsive to the VAD estimate respectively indicating a presence or an absence of speech, a second complex-valued covariance matrix corresponding to a quickly-adapting beamformer; and controlling, by a hardware processor, a voice user interface based device to perform a user perceptible action, responsive to an output of at least the quickly-adapting beamformer.

23. A voice control system, comprising:

one or more memories, individually or in combination, having instructions;

one or more processors each coupled to at least one of the one or more memories and configurable to execute the instructions to transform, using a short-time Fourier transform (STFT) applied to data in each of a plurality of windows aligned across each input channel of a multichannel audio stream, the multichannel audio stream into a complex valued frequency-domain representation, wherein for a current one of the plurality of windows, the one or more processors are configurable to execute the instructions to:

update a first complex-valued covariance matrix corresponding to a slowly-adapting beamformer and forming a single-channel denoised estimate for each frequency band in the STFT;

calculate a voice activity detection (VAD) estimate for each frequency band in the STFT by comparing a magnitude of the single-channel denoised estimate to a magnitude of each input channel of the multichannel audio stream; and selectively update or refraining from updating, responsive to the VAD estimate respectively indicating a presence or an absence of speech, a second complex-valued covariance matrix corresponding to a quickly-adapting beamformer; and control a voice user interface based device to perform a user perceptible action, responsive to an output of at least the quickly-adapting beamformer.

\* \* \* \* \*